(12) United States Patent
Hashimoto

(10) Patent No.: US 11,264,852 B2
(45) Date of Patent: Mar. 1, 2022

(54) MOTOR

(71) Applicants: Hyundai Motor Company, Seoul (KR); Kia Motors Corporation, Seoul (KR)

(72) Inventor: Takenori Hashimoto, Yokohama (JP)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 336 days.

(21) Appl. No.: 16/186,905

(22) Filed: Nov. 12, 2018

(65) Prior Publication Data
US 2020/0028395 A1 Jan. 23, 2020

(30) Foreign Application Priority Data
Jul. 20, 2018 (JP) .............................. JP2018-136487

(51) Int. Cl.
| | |
|---|---|
| *H02K 1/32* | (2006.01) |
| *B60K 1/00* | (2006.01) |
| *B60K 11/02* | (2006.01) |
| *H02K 9/19* | (2006.01) |

(52) U.S. Cl.
CPC ................. *H02K 1/32* (2013.01); *B60K 1/00* (2013.01); *B60K 11/02* (2013.01); *H02K 9/19* (2013.01); *B60K 2001/006* (2013.01)

(58) Field of Classification Search
CPC ............... H02K 1/32; H02K 5/20; H02K 9/19
See application file for complete search history.

(56) References Cited

U.S. PATENT DOCUMENTS

2009/0261667 A1* 10/2009 Matsubara ........... H02K 1/2766
                                                                 310/54
2013/0334912 A1    12/2013 Tokunaga et al.
2015/0280525 A1    10/2015 Rippel et al.

FOREIGN PATENT DOCUMENTS

| DE | 102008020426 A1 | 10/2009 |
|---|---|---|
| EP | 1414134 A2 | 4/2004 |
| EP | 1953896 A1 | 8/2008 |
| JP | 2008-219960 A | 9/2008 |
| JP | 2012-165620 A | 8/2012 |
| JP | 2015-100177 A | 5/2015 |

* cited by examiner

*Primary Examiner* — Ramon M Barrera
(74) *Attorney, Agent, or Firm* — Mintz Levin Cohn Ferris Glovsky and Popeo, P.C.; Peter F. Corless

(57) ABSTRACT

A cooling structure is provided that cools a rotor in a motor. The motor includes a shaft that is rotatably supported on a case and a rotor having a rotor core to which a plurality of magnets are provided on an outer periphery of the shaft and which is disposed to face a stator. Flow passages are formed on the shaft and the rotor and cooling oil passes through a core flow passage inside the rotor core from an introduction flow passage on a first side in an axial direction of the shaft and flows to the introduction flow passage on a second side in the axial direction of the shaft. An inlet communicating with the introduction flow passage and an outlet communicating with the introduction flow passage are formed in the case.

11 Claims, 4 Drawing Sheets

[ CROSS-SECTION OF ROTOR TAKEN ALONG A-A ]

[ PERSPECTIVE VIEW OF CROSS-SECTION
OF ROTOR TAKEN ALONG B-B ]

MOTOR

CROSS-REFERENCE TO RELATED APPLICATION

This application claims under 35 U.S.C. § 119(a) the benefit of priority to Japanese Patent Application No. 2018-136487 filed on Jul. 20, 2018, the entire contents of which are incorporated herein by reference.

BACKGROUND

(a) Technical Field

The present disclosure relates to a motor, and more particularly, to a motor to be used in a pure electric vehicle (EV) or a hybrid vehicle (HEV) and that efficiently suppresses a temperature increase.

(b) Background Art

A developed technique in the related art teaches a configuration in which cooling oil is pressure-fed to a flow passage formed in a shaft and is introduced into a clearance between an inner peripheral surface of a hole through which a shaft of a rotor core penetrates. The cooling oil is then introduced into an inner flow passage on an inner side of a permanent magnet and is discharged to an outer side of the rotor. However, since the cooling oil is discharged and circulated into a case, the cooling oil is forcibly injected between the rotor and a stator to generate a drag torque which causes a deterioration in efficiency of the motor. In addition, since the pump of the cooling oil is within the case, the temperature of the cooling temperature disadvantageously increases.

The above information disclosed in this section is merely for enhancement of understanding of the background of the disclosure and therefore it may contain information that does not form the prior art that is already known in this country to a person of ordinary skill in the art.

SUMMARY

The present disclosure provides a cooling structure capable of efficiently cooling a rotor in a motor.

In one aspect, the present invention provides a motor that may include: a shaft rotatably supported on a case; a rotor having a rotor core to which a plurality of magnets may be provided on an outer periphery of the shaft and disposed to face a stator on the case side; and flow passages formed on the shaft and the rotor to allow cooling oil to pass through a core flow passage inside the rotor core from an introduction flow passage on a first side in an axial direction of the shaft and to flow to the introduction flow passage on a second side in the axial direction of the shaft, wherein an inlet in communication with the introduction flow passage and an outlet in communication with the introduction flow passage may be formed in the case.

In an exemplary embodiment, the introduction flow passage and the core flow passage may be connected to each other by a supply flow passage, the core flow passage and the introduction flow passage may be connected to each other by a discharge flow passage, the core flow passage and the core flow passage may be connected to each other by a return flow passage, and the supply flow passage and the discharge flow passage may be formed by branched flow passages which are branched into at least two. In addition, the branched flow channel may include the core flow channel provided in an odd number. Both sides of the rotor core may be disposed between end plates, and the supply flow passage and the discharge flow passage may be disposed on the end plate. The rotor core may have a structure in which a plurality of electronic steels are stacked by bonding and embedded in the electronic steel plates on which the magnets are stacked.

In particular, since the inlet in communication with the introduction flow passage and the outlet in communication with the discharge flow passage may be formed in the case, the cooling oil may be supplied from the outside of the case and returned to the outside of the case. The cooling oil may be cooled outside, and as a result the temperature in the motor may be efficiently reduced due to the cooled cooling oil. The flow passage may include the introduction flow passage on a first side in the axial direction of the shaft, the core flow passage inside the rotor core, and the discharge flow passage on a second side in the axial direction of the shaft. Since the flow passage may be formed in the shaft and the rotor core, the cooling oil may flow more smoothly in the flow passage, thereby efficiently reducing the temperature in the motor. Since no cooling oil is discharged into the case, the cooling oil may be forcibly injected between the rotor and the stator, thus preventing drag torque from being generated.

The introduction flow passage and the core flow passage may be connected to each other by the supply flow passage, the core flow passage and the discharge flow passage may be connected to each other by the discharge flow passage, the core flow passage and the core flow passage may be connected to each other by the return flow passage. The supply flow passage and the discharge flow passage may be the branched flow passages which are branched into at least two, such that the cooling oil may flow from one side to the other side without an extra core flow passage. For example, when the number of core flow passages is 10, if 10 core flow passages reciprocate in one cylinder, the outlet on the last core flow passage comes to the supply side. In other words, 11 core flow passages may be provided. However, when the core flow passage is divided into the routes of five and five two-system, one system may include five flow passages which are an odd number and thus, the outlet of the last core flow passage may come to the discharge side.

Since the number of core flow passages is an odd number, the branched flow passage does not require an extra core flow passage, and the outlet of the last core flow passage comes to the discharge side. For example, when the total number of core flow passages is 8, the number of core flow passages may be divided into a (five, three) two-system, and the number of core flow passages in each system may be set to be an odd number. When the core flow passages are divided into a (four, four) two-system, the outlet of the last core flow passage does not come to the discharge side.

Further, since both sides of the rotor core may be disposed between the end plates, both the supply passage and the discharge passage may be formed on the end plates. The end plate may have a circular plate body and thus, the supply flow passage and the discharge flow passage may extend in any direction from the center. The end plate may include a semicircular groove and a first side thereof may be closed by the end of the rotor core to thus form the supply passage and the discharge passage.

Since the plurality of electromagnetic steel plates may be stacked by the bonding, comparing the stacking of the electromagnetic steel plates by the bonding with the coupling by the caulking, the electromagnetic steel plates are not omitted from the clearance. Further, when receiving apertures are formed on the electromagnetic steel plates, the magnet may be embedded more easily. When the through apertures are formed on the electromagnetic steel plates, the core flow passage may be formed more easily.

BRIEF DESCRIPTION OF THE DRAWINGS

The above and other features of the present disclosure will now be described in detail with reference to exemplary embodiments thereof illustrated the accompanying drawings which are given hereinbelow by way of illustration only, and thus are not limitative of the present disclosure, and wherein.

Figure 1:
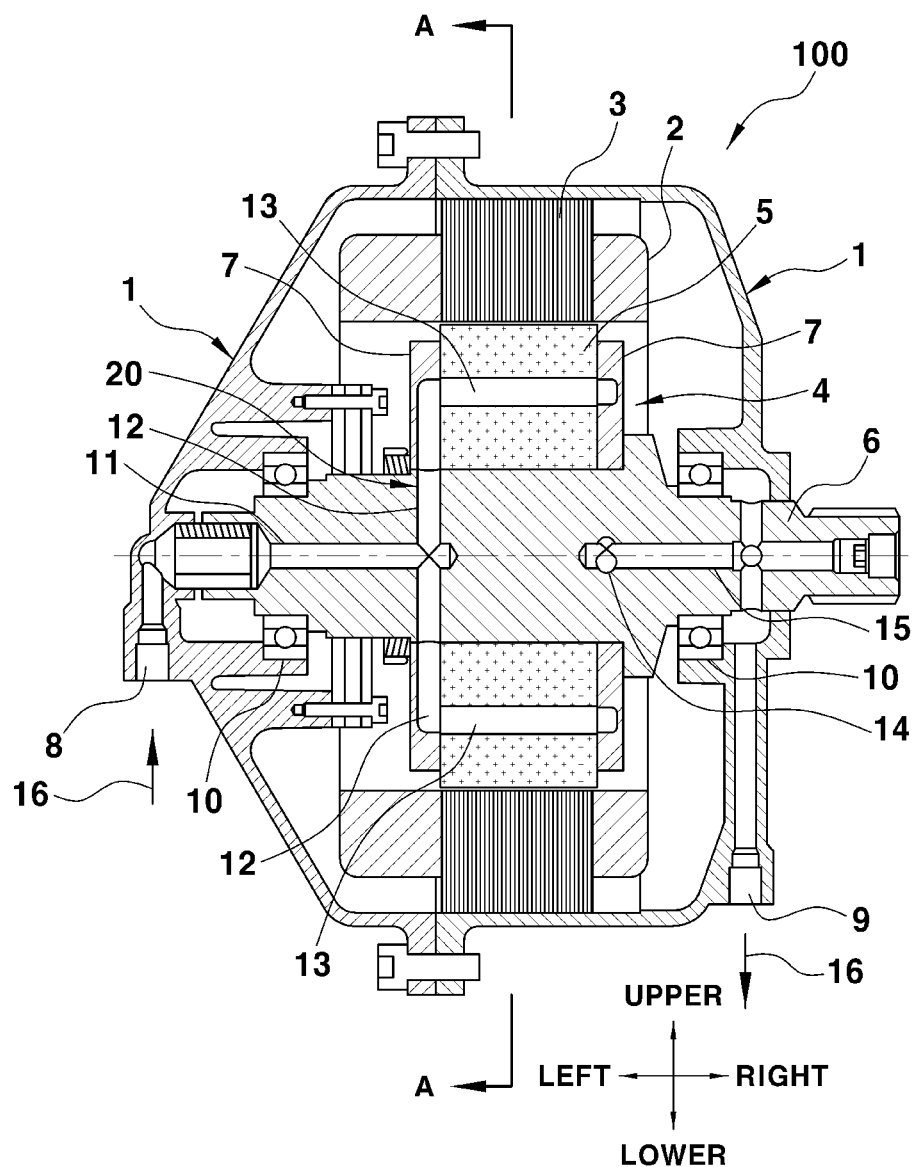
FIG. 1 is a cross-sectional view of a motor according to an exemplary embodiment the present invention.

It should be understood that the appended drawings are not necessarily to scale, presenting a somewhat simplified representation of various exemplary features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other exemplary embodiments, which may be included within the spirit and scope of the disclosure as defined by the appended claims.

Hereinafter, a motor of the present disclosure will be described in detail with reference to the accompanying drawings.

FIG. 1 is a cross-sectional view of a motor 100 according to the present invention. The motor 100 may be entirely housed or enclosed within a case 1. A shaft 6 rotatably supported by a bearing 10 may be indisposed within the case 1, in a left-right direction at a center thereof. Additionally, a rotor 4 may be disposed on an outer periphery of the shaft 6 and may be configured to rotate together with the shaft 6. The rotor 4 includes a rotor core 5 to which a plurality of magnets 17 may be fixed. A stator 2 may include a coil 3, disposed outside the rotor 4, and disposed to face the rotor 4.

Additionally, cooling oil 16 may enter the case 1 from an inlet 8 formed in the case 1, and may pass through a flow passage 20 inside the motor 100 to then be discharged from an outlet 9 of the case. An introduction flow passage 11 may be formed on one side (e.g., left side or a first side) of the shaft 6 in an axial direction of the shaft 6. The cooling oil 16 may flow from the introduction flow passage 11 to the core flow passage 13 inside the rotor core 5. A left end of the introduction flow passage 11 may thick to operate as a buffer for the cooling oil 16. A discharge passage 15 may be formed on the other side (e.g., right side or second side) of the shaft in the axial direction of the shaft 6.

The cooling oil 16 from the core flow passage 13 may flow toward the discharge passage 15. In particular, the introduction flow passage 11 and the core flow passage 13 may be connected to each other by a supply flow passage 12. The core flow passage 13 and the discharge passage 15 may be connected to each other by a discharge flow passage 14. The supply flow passage 12 and the discharge flow passage 14 may be formed by branched flow passages branched into two passages in the present exemplary embodiment.

Figure 2:
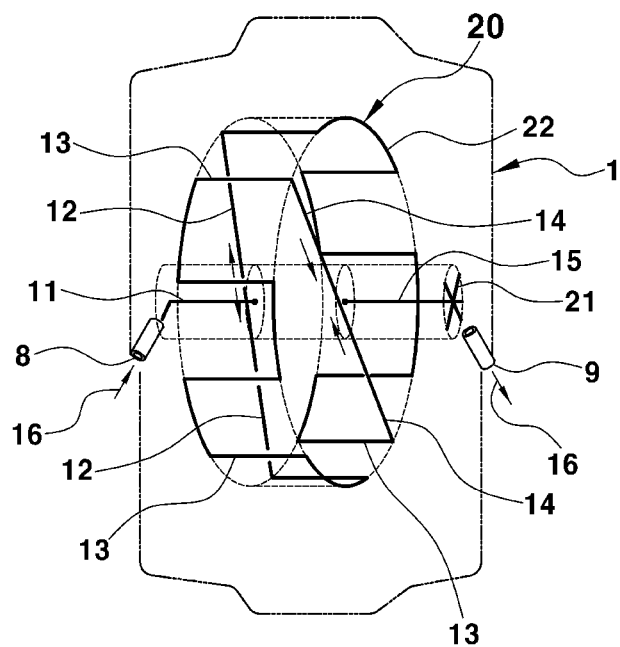
FIG. 2 is a diagram showing a configuration of a flow passage from an inlet to an outlet of FIG. 1 according to an exemplary embodiment the present invention.

FIG. 2 is a view showing a configuration of a flow passage 20 from the inlet 8 to the outlet 9 in FIG. 1. The cooling oil 16 may enter the introduction flow passage 11 from the inlet 8 of the case 1. In particular, the introduction flow passage 11 may be formed at the center of the shaft 6. Even if the shaft 6 rotates, the supply of the cooling oil 16 may be performed without being interrupted. The configuration may be branched into systems, specifically a plurality of supply flow passages 12 may be formed next to the introduction flow passage 11. In particular, the cooling oil 16 may pass through five core flow passages 13 and four return flow passages 22 on a first of the supply flow passages 12 and may reach the discharge flow passage 14, and pass through five core flow passages 13 and four return flow passages 22 on a second of the supply flow passages 12 and may reach the discharge flow passage 14.

The core flow passage 13 may be disposed along the axial direction, and the cooling oil 16 may flow to reciprocate both ends of the rotor core 5. The discharge flow passages 14 may join the discharge passage 15. A leading end of the discharge passage 15 may include four outlet apertures in a direction orthogonal to the axial direction of the shaft 6. When the shaft 6 is rotating, if the outlet aperture and the outlet 9 coincide with each other, the cooling oil 16 may be discharged to the outside. A structure of the outlet aperture may decrease a length of the motor 100 in the left-right direction.

In the present exemplary embodiment, ten core flow passages 13 may be provided inside the rotor core 5. When divided into two systems, ten core flow passages 13 may be divided into (five, five) two-system. In other words, when the configuration is divided into two systems, each system may include five core flow passages 13. The number of core flow passages 13 in each system is an odd number since the cooling oil 16 may enter from a first side of the shaft 6 and may be discharged to a second side of the shaft 6. For example, if the number of core flow passages 13 is eight, when divided into two systems, the core flow passage may be divided into five or three.

Figure 3:
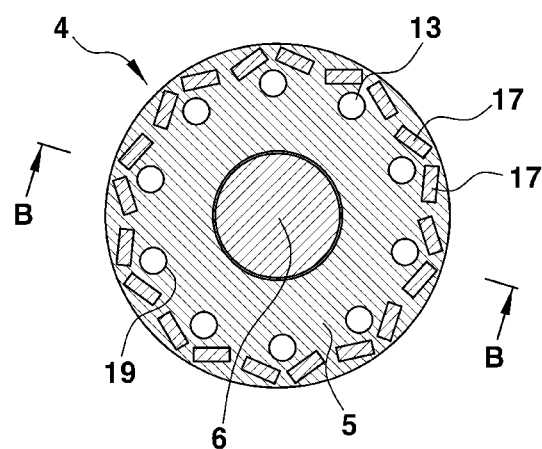
FIG. 3 is a cross-sectional view of a rotor taken along system A-A' of FIG. 1 according to an exemplary embodiment the present invention.

FIG. 3 is a cross-sectional view of the rotor 4 taken along line A-A' of FIG. 1. The magnet 17 is 2-division 10 poles and may be embedded in the rotor core 5. One pole may include two magnets of (N, N) or (S, S). Additionally, one pole may be disposed with one end facing the center of the shaft 6. (N, N) and (S, S) are alternately disposed with each other. In the present embodiment, ten core flow passages 13 may be disposed according to the number of poles. When the magnets 7 are cooled individually, twenty core flow passages 13 may be provided twice (integral multiple) to correspond to the number of poles. In particular, in the case of four systems, 20 each system may include five core flow passages (five, five, five, five). In the two systems, each system may include ten core flow passage becomes (10, 10), and the number of the core flow passages 13 in one system is an even number, and the system may be divided into four systems which are an odd number.

Figure 4:
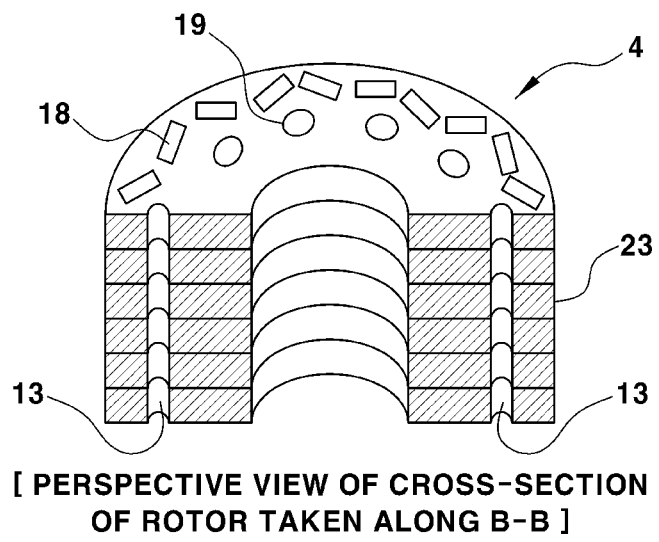
FIG. 4 is a cross-sectional view of the rotor taken along system B-B' of FIG. 3 according to an exemplary embodiment the present invention.

FIG. 4 is a cross-sectional view of the rotor 4 taken along line B-B' of FIG. 3. In FIG. 4, the magnet 17 is excluded. As shown in FIG. 4, the rotor core 5 has a structure in which a plurality of six electromagnetic steel plates 23 may be bonded and stacked. The magnet 17 may be mounted on the receiving aperture 18 formed in the electromagnetic steel plate 23 and an aperture 19 becomes the core flow passage 13.

Figure 5A:
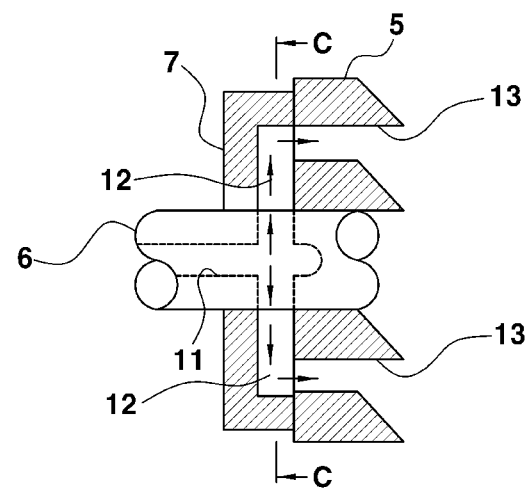
FIGS. 5A and 5B are explanatory diagrams of an end plate shown in FIG. 1 according to an exemplary embodiment the present invention.
Figure 5B:
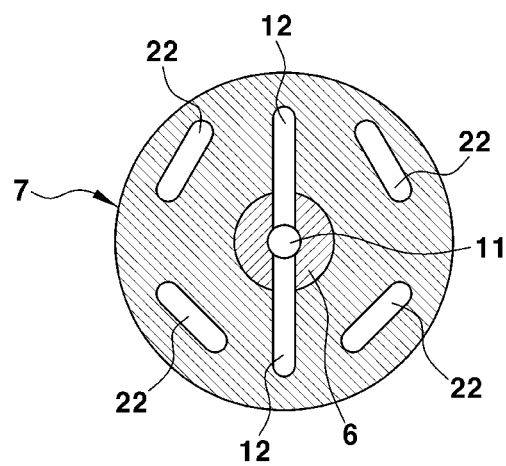

FIGS. 5A and 5B are explanatory diagrams of the end plate shown in FIG. 1. FIG. 5A is the end plate 7 at the left end of FIG. 1. As shown in FIG. 5A, the supply flow passage 12 formed as the groove on the end plate 7 may connect the introduction flow passage 11 to the core flow passage 13. FIG. 5B is a cross-sectional view taken along the line C-C of FIG. 5A. As shown in FIG. 5B, the return flow passage 22 formed as the groove on the end plate 7 may connect between the core flow passage 13 to the core flow passage 13. The end plate 7 on the right end in FIG. 1 may have the same structure.

According to the cooling structure of the motor of the present invention, the temperature increase of the motor may be effectively suppressed, and thus it is very suitable as the motor used for EV and HEV. In addition, although the exemplary embodiments of the present disclosure are described above in detail, the protection scope of the present disclosure is not limited thereto. Therefore, various changes and improved forms by those skilled in the art using basic concepts of the present disclosure defined in the following claims belongs to the protection scope of the present disclosure.

What is claimed is:

1. A motor, comprising:
   a shaft rotatably supported on a case formed with a front wall, a side wall, and a rear wall;
   a rotor having a rotor core to which a plurality of magnets are provided on an outer periphery of the shaft and disposed to face a stator; and
   flow passages formed on the shaft and the rotor and cooling oil passes through a core flow passage inside the rotor core from an inflow passage formed in a first side of the shaft in an axial direction of the shaft and flows to a discharge passage formed in a second side of the shaft in the axial direction of the shaft,
   wherein an inlet in communication with the inflow passage is formed in the front wall of the case in an orthogonal direction to the axial direction of the shaft and an outlet in communication with the discharge passage is formed in the rear wall of the case in an orthogonal direction to the axial direction of the shaft.

2. The motor of claim 1, wherein the inflow passage and the core flow passage are connected to each other by a supply flow passage, the core flow passage and the discharge passage are connected to each other by a discharge flow passage, the core flow passage and the core flow passage are connected to each other by a return flow passage, and the supply flow passage and the discharge flow passage are formed by branched flow passages which are branched into at least two.

3. The motor of claim 2, wherein the rotor core has a structure in which a plurality of electronic steel plates are stacked by bonding and the plurality of magnets are embedded in the electronic steel plates.

4. The motor of claim 2, wherein each of the branched flow passages is connected to the core flow passage which is provided in an odd number.

5. The motor of claim 2, wherein both sides of the rotor core are disposed between end plates, and the supply flow passage and the discharge flow passage are provided on the end plate.

6. The motor of claim 5, wherein the rotor core has a structure in which a plurality of electronic steel plates are stacked by bonding and the plurality of magnets are embedded in the electronic steel plates.

7. The motor of claim 1, wherein the rotor core has a structure in which a plurality of electronic steel plates are stacked by bonding and the plurality of magnets are embedded in the electronic steel plates.

8. The motor of claim 1, where the core flow passage and the discharge passage are connected to each other by a discharge flow passage.

9. The motor of claim 8, wherein a leading end of the discharge passage includes four outlet apertures in a direction orthogonal to the axial direction of the shaft.

10. A vehicle including a motor of claim 1.

11. A motor, comprising:
    a shaft rotatably supported on a case formed with a front wall, a side wall, and a rear wall;
    a rotor having a rotor core to which a plurality of magnets are provided on an outer periphery of the shaft and disposed to face a stator; and flow passages formed on the shaft and the rotor and cooling oil passes through a core flow passage inside the rotor core from an inflow passage on a first side of the shaft in an axial direction of the shaft and flows to a discharge passage on a second side of the shaft in the axial direction of the shaft, wherein an inlet in communication with the inflow passage is formed in the front wall of the case in an orthogonal direction to the axial direction of the shaft and an outlet in communication with the inflow passage is formed in the rear wall of the case in an orthogonal direction to the axial direction of the shaft, wherein a leading end of the discharge passage includes a plurality of outlet apertures formed in a direction orthogonal to the axial direction of the shaft such that when one of the plurality of the outlet apertures and the outlet coincide with each other while the shaft is rotating, the cooling oil is discharged to an outside of the case through the one of the plurality of outlet apertures and the outlet.

* * * * *